United States Patent [19]

Kudo

[11] Patent Number: 4,706,085
[45] Date of Patent: Nov. 10, 1987

[54] APPARATUS AND METHOD FOR GENERATING MULTI-DIGIT CODES

[75] Inventor: Yoshihisa Kudo, Tokyo, Japan

[73] Assignee: NEC Corporation, Japan

[21] Appl. No.: 625,048

[22] Filed: Jun. 27, 1984

[30] Foreign Application Priority Data

Jun. 30, 1983 [JP] Japan ............................ 58-101842[U]

[51] Int. Cl.[4] .......................... H04Q 7/00; G08B 5/22
[52] U.S. Cl. .......................... 342/825.56; 340/825.44; 340/825.52; 340/311.1
[58] Field of Search .................. 340/825.56, 825.44, 340/825.3, 825.31, 825.32, 825.33, 825.34, 825.54, 365.5, 311.1, 825.52, 825.53; 235/439, 435; 361/172; 364/706, 709; 179/2 EC; 455/95, 89; 380/47

[56] References Cited

U.S. PATENT DOCUMENTS 4,198,619 4/1980 Atalla ............................ 340/825.34
4,514,731 4/1985 Falck et al. ..................... 340/825.54

Primary Examiner—Ulysses Weldon
Assistant Examiner—Ralph E. Smith
Attorney, Agent, or Firm—Laff, Whitesel, Conte & Saret

[57] ABSTRACT

A radio apparatus, particularly a personal transceiver, includes a manual keypad for keying numerical data, read and write function keys, and a data processor. The processor is programmed to store keyed numerical data representing part of a multi-digit destination code into a storage location of a read-write memory in response to operation of the write function key and store keyed numerical data representing the address of the storage location. The stored part-destination code data are retrieved in response to successive operation of the read function key and the keyed keying numerical data representing the address of the storage location. In response to subsequent operation of the keypad keying numerical data representing an additional digit, the latter is appended to the part-destination code read from the memory to complete a full destination code.

4 Claims, 3 Drawing Figures

4,706,085

APPARATUS AND METHOD FOR GENERATING MULTI-DIGIT CODES

BACKGROUND OF THE INVENTION

The present invention relates to apparatus and method for generating multi-digit destination codes which are used in radio transceivers for establishing communication between stations.

In personal radio transceivers, a call is set up by selecting a five-digit destination code. Destination codes of frequently called stations are usually stored in a memory to fascilitate calling operation.

Conventional personal transceivers comprise a code entry keypad having 0- to 9-figure keys, a memory write function key, a memory read function key and a five-digit display. The ten figure keys are used to enter a desired destination code which is stored in response to the operation of the write-in function key followed by the specification of an associated access code. The stored five-digit code is retrieved in response to the operation of the read function key followed by the depression of a figure key representing the access code.

One shortcoming in the conventional personal transceiver is that the memory capacity is limited because of the space and cost problems. While it is technically possible, an attempt to increase the memory capacity would result in an increase in hardware components with an attendant increase in size and cost.

SUMMARY OF THE INVENTION

The present invention is to eliminate the problem just mentioned without increasing the memory capacity and has for its object the provision of a radio apparatus having a memory capacity practically ten times the current memory capacity.

The present invention provides a radio apparatus having a code generating circuit including a manual keypad for keying numerical data and write and read function keys. The apparatus comprises a read-write memory means, and a data processor. The processor is programmed to store keyed numerical data representing part of a multi-digit destination code into a storage location of the memory in response to operation of the write function key and store keyed numerical data representing the address of the storage location. The stored part-destination code data are retrieved in response to successive operation of the read function key and the keypad keying the address respresenting numerical data. In response to subsequent operation of the keypad keying an additional digit, the latter is appended to the part destination code read out of the memory to complete a full destination code.

With the memory storing a part destination code, the most or least significant digit position of the code is left vacant, thus saving the memory capacity. By operating the keypad to generate the additional digit, the vacated digit position is filled to complete the destination code.

BRIEF DESCRIPTION OF THE DRAWINGS

The present invention will be described in further detail with reference to the accompanying drawings, in which.

DETAILED DESCRIPTION

Figure 1:
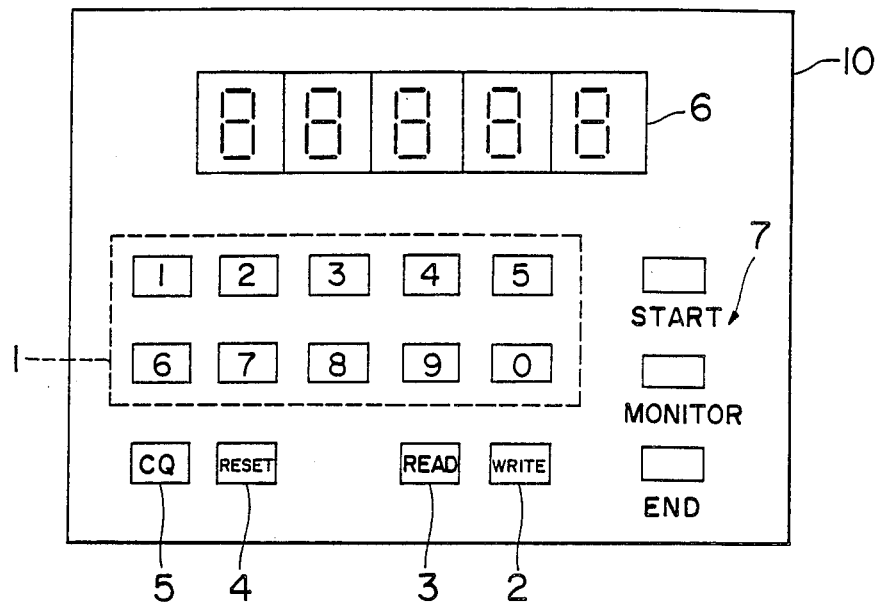
FIG. 1 is an illustration of a control panel of a personal transceiver.

FIG. 1 is an illustration of a control panel of a personal transceiver embodying the present invention. This control panel 1 is provided with a code entry keypad 1 having ten figure keys, a memory write command key 2, a memory readout command key 3, reset key 4 and CQ key 5. A five-digit seven-segment display 6 and light-emitting diodes 7 are provided for call status indication.

Figure 2:
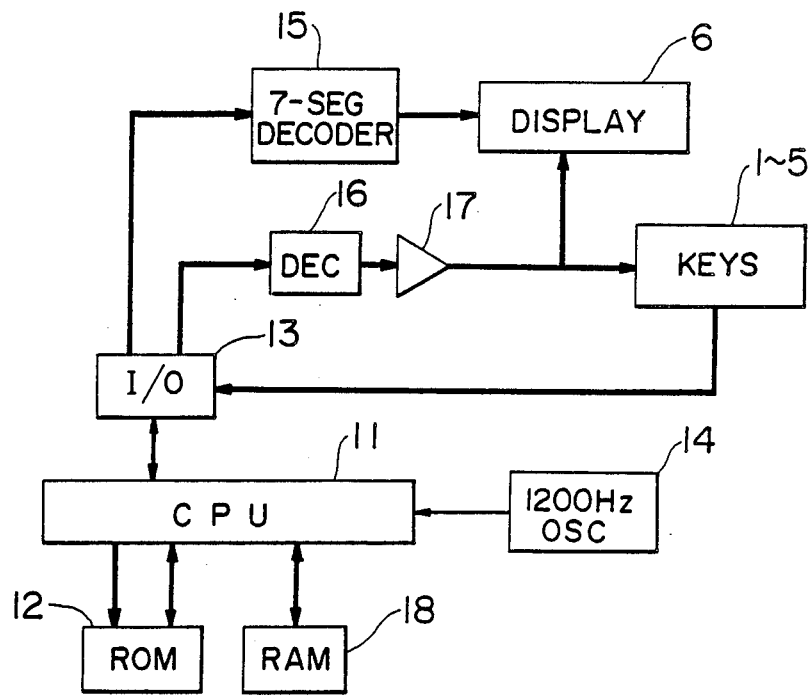
FIG. 2 is a block diagram of the data processor of the personal transceiver.

FIG. 2 is an illustration of a block diagram of a data processor programmed according to the present invention. A microprocessor (CPU) 11 is driven by a 1200-Hz clock supplied from a clock generator 14 to perform operations on the various functions of the personal transceiver including code number write and read operations and transmission of code numbers upon request. Command signals are generated by function keys 2–5 and destination code is keyed in by the figure keys on keypad 1. Since the present invention is concerned with write and read operations of destination codes, descrition is omitted with respect to the operation of the CQ and reset keys. A read only memory (ROM) 12 stores programmed instructions which will be described in detail later. Key inputs are fed to the microprocessor 11 through an input/output port 13 and output data to LED display 6 are fed through the port 13 to four-input decoder 16 and inverter 17 and through a 7-segment decoder-driver 15. The microprocessor flashes the LED display 6 on a per digit basis at clock intervals. To effect this flashing operation, the decoder 16 shifts the display 6 one digit position in response to shift command signal from the microprocessor at clock intervals and a digit signal is applied from the CPU to the segment decoder 15 in synchronism with the rate at which the display is shifted. Decoder 16 disributes voltages necessary for keying operation to the keypad 1 and other keys 2 to 5 at clock intervals. Random access memory (RAM) 18 has a memory capacity capable of storing as many as five destination codes of four digits each and other information necessary for addressing the stored data.

Figure 3:
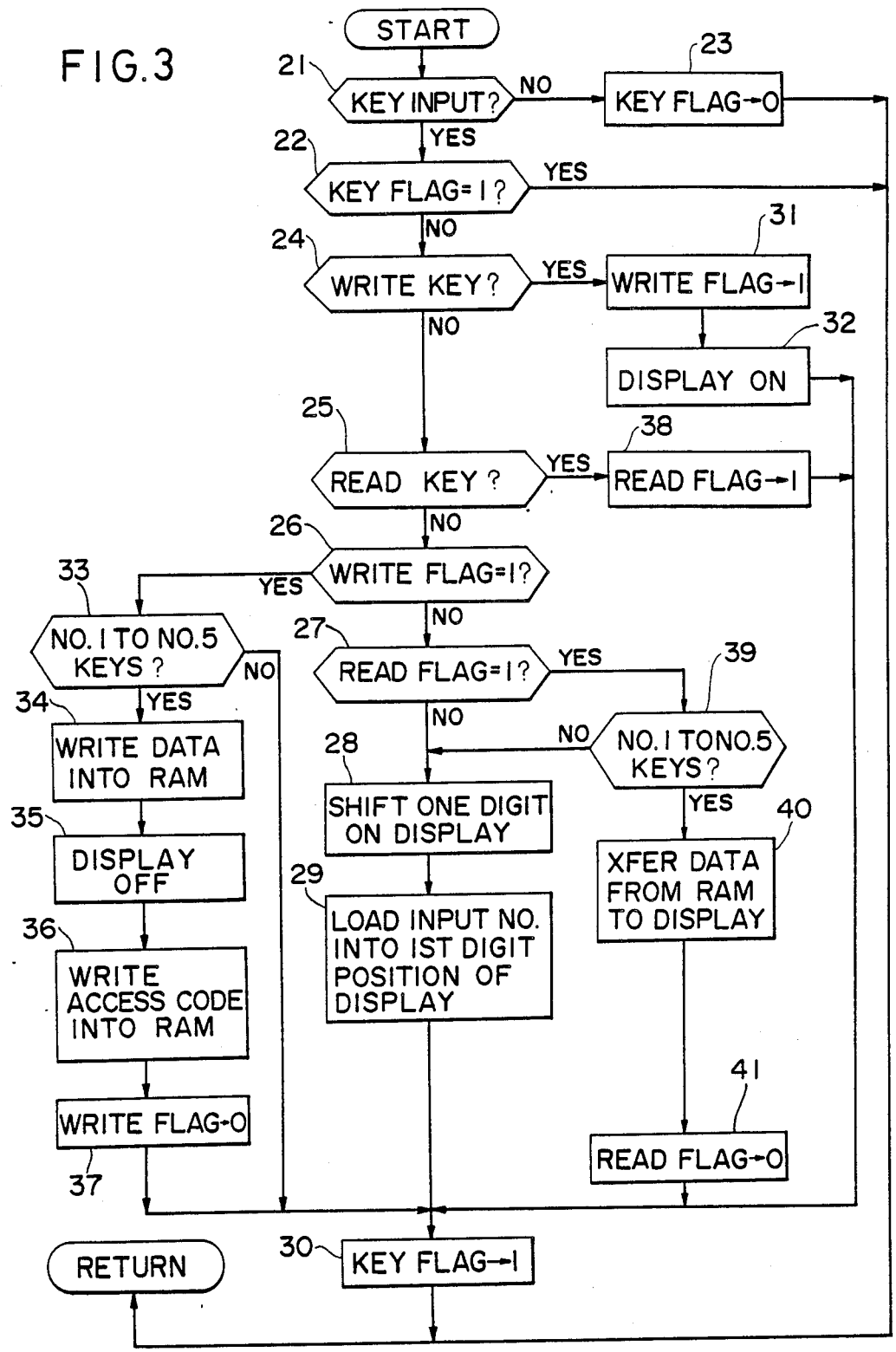
FIG. 3 is a flow diagram describing the operation of the microprocessor of FIG. 2.

The write operation of the microprocessor for storing destination codes will now be described with reference to a programmed routine shown in FIG. 3. The program is initiated at regular intervals of typically 5/1200 seconds. In the absence of operation of any one of figure keys on keypad 1 and keys 2 and 3, control is passed through block 21 to block 23 to unset key flag. Operation of such a key will cause control to be passed to block 22 to discover if the key flag has already been set, and if it has, the condition indicates that the processor is still performing operation on a previous key operation. When this occurs the processor jumps to the end of the routine to nullify the subsequent key operation.

It is assumed that the operator stores a destination code "87653" in a storage location of the RAM 18 which is addressed by an access code 4, for example.

Operation of the numeral 8 key on the keypad 1 is detected in block 21 and control is passed through blocks 22, 24, 25, 26 and 27 to block 28 where it shifts data to be loaded into LED display 6 one digit to the next higher positions. Control is advanced to block 29 to load the keyed-in information, i.e. numeral 8 into the first or least significant digit position of the display 6. The processor proceeds to block 30 to set key flag.

It will be seen that in response to each operation of succeeding the numeral 7, the numeral 6, and the numeral 5 keys at appropriate intervals the display is shifted one digit to the next higher position and numbers "7", "6" and "5" are loaded into the least significant digit position and thereafter shifted in succession to higher digit positions. It is noted that the least signicant digit number "3" is not keyed in at this moment and the most significant digit position is left vacant.

Next, the write command key 2 is depressed. Upon depression of this key, control is passed through blocks 21, 22, 24 to block 31 to set write flag and thence to block 32 to turn on display 6 to provide the loaded numbers "8765" on display. Control is advanced to block 30 to set key flag again.

With the write flag being set, the access code 4 is keyed in by depression of the numeral 4 key. Control is passed through blocks 21, 22, 24, 25 to block 26 and exits to block 33 to discover if the keyed-in number corresponds to any one of preassigned access codes "1" to "5". Since the condition is true, the processor proceeds to block 34 to write the keyed-in numeral data "8765" into a storage location of the RAM 18 which is addressed by access code 4. The LED display 6 is turned off (block 35) and the write-in access code "4" is stored into RAM 18 (block 36). Control is advanced to block 37 to unset the write flag.

The write operation just described may be repeated to store destination codes as many as there are preassigned memory access codes available. In the present embodiment, the number of such preassigned access codes is five as determined by the memory capacity. The program step at block 33 is to reject a request which is made when the available number is exceeded.

The stored destination codes are retrieved by operating the memory read key 3. The operation of read key 3 causes the processor to pass through blocks 21, 22, 24, 25 to block 38 to set read flag. An access code associated with the calling party is depressed on the code entry unit 1. For example, the stored destination code "8765X" (where X is a number to be added later) is retrieved by operating numeral 4 key. When this occurs, control is passed through blocks 21, 22, 24, 25, 26 and 27 to block 39 to discover if a preassigned access number has been depressed, and if it has, the processor proceeds to block 40 to read the stored data from RAM 18 into LED display 6 to put "08765" on display. Read flag is subsequently unset in block 41. With the most significant digit position being left blank, the operator depresses the least significant digit number "3". Microprocessor 11 now has to add the last number to the previously stored code to complete the desired destination code. It does this by having control pass through blocks 2, 22, 24, 25, 26, 27 to block 28 to shift displayed data one digit to higher positions to leave the least significant digit position vacant and proceed to block 29 to load the keyed-in number "3" into the vacated least significant digit position, whereby the destination code "87653" is completed and displayed.

Therefore, the stored code "8765" can be readily changed to a desired full destination code by the addition of a desired least significant digit number. Practically, the present invention permits the number of destination codes that can be stored in memory to be increased ten times without increasing the memory capacity. The foregoing description shows only preferred embodiments of the present invention. Various modifications are apparent to those skilled in the art without departing from the scope of the present invention which is only limited by the appended claims. For example, the direction in which data are shifted in digit position could be reversed so that the most significant digit position is vacated to allow insertion of the additional digit. The embodiments shown and described are only illustrative, not restrictive.

What is claimed is:

1. A radio apparatus having a code generating circuit including a manual keypad for keying numericl data, and write and read function keys, said apparatus comprising:
    display means having a plurality of successive digit positions;
    read-write memory means; and
    data processing means for storing keyed numerical data representing part of a multi-digit destination code into a storage location in said memory means in response to operation of said write function key, storing keyed numerical data representing an address of said storage location, reading the stored part of said destination code data in response to successive operations of said read function key and said keypad keying of numerical data representing said address, and appending an additional digit to said part of said destination code read out of said memory means to complete said destination code in response to a subsequent operation of said keypad keying of numerical data representing said additional digit, said data processing means being programmed to perform the steps of:
    (a) shifting the digit positions of said part of said destination code by one digit in response to an operation of said keypad keying of numerical data representing each of the digits of said destination code;
    (b) loading said part of said destination code into said display means so that one of the most significant digit positions of said display means is left vacant; and
    (c) loading said additional digit into the vacant one of the most significant digit positions.

2. A method for the registration of a multi-digit destination code in response to an operation of a manual keypad for keying numerical data and write and read function keys prior to transmission of the destination code, said method comprising:
    storing keyed numerical data representing part of a destination code of a predetermined number of digits into a storage location of a memory in response to operation of said write function key;
    storing keyed numerical data representing an address of said storage location;
    reading the stored part of said destination code data in response to successive operation of said read function key and said keypad of numerical data representing said address;
    appending an additional digit to said part of said destination code read out of said memory to complete said destination code in response to a subsequent operation of said keypad keying said additional digit;
    shifting the digit positions of said part of said destination code by one digit in response to operation of said keypad keying of numerical data representing each of the digits of said destination code;
    loading said part destination code into a display having successive digit position so that one of the most significant digit positions of said display is left vacant; and loading said additional digit into the vacated one of the most significant digit positions.

3. A radio apparatus having a code generating circuit including a manual keypad for keying numerical data, and write and read function keys, said apparatus comprising:

display means having a plurality of successive digit positions;

read-write memory means; and data processing means for storing keyed numerical data representing part of a multi-digit destination code into a storage location in said memory means in response to operation of said write function key, storing keyed numerical data representing an address of said storage location, reading the stored part of said destination code data in response to successive operations of said read function key and said keypad keying of numerical data representing said address, and appending an additional digit to said part of said destination code read out of said memory menas to complete said destination code in response to a subsequent operation of said keypad keying of numerical data representing said additional digit, said data processing means being programmed to perform the steps of:

(a) shifting the digit positions of said part of said destination code by one digit in response to an operation of said keypad keying of numerical data representing each of the digits of said destination code;

(b) loading said part of said destination code into said display means so that one of the least significant digit positions of said display means is left vacant; and (c) loading said additional digit into the vacant one of the least significant digit positions.

4. A method for the registration of a multi-digit destination code in response to an operation of a manual keypad for keying numerical data and write and read function keys prior to transmission of the destination code, said method comprising:

storing keyed numerical data representing part of a destination code of a predetermined number of digits into a storage location of a memory in response to operation of said write function key;

storing keyed numerical data representing an address of said storage location;

reading the stored part of said destination code data in response to successive operation of said read function key and said keypad keying of numerical data representing said address;

appending an additional digit to said part of said destination code read out memory to complete said destination code in response to subsequent operation of said keypad keying said additional digit;

shifting the digit positions of said part of said destination code by one digit in response to operation of said keypad keying of numerical data representing each of the digits of said destination code;

loading said part destination code into a display having successive digit positions so that one of the least significant digit positions of said display is left vacant; and loading said additional digit into the vacated one of the least significant digit positions.

* * * * *